United States Patent
Kirsch et al.

(10) Patent No.: US 7,481,620 B2
(45) Date of Patent: Jan. 27, 2009

(54) WIND POWER PLANT

(75) Inventors: Reinhard Kirsch, Hochstadt (DE); Siegfried Derrer, Hochstadt (DE)

(73) Assignee: AB SKF, Gothenburg (SE)

( * ) Notice: Subject to any disclaimer, the term of this patent is extended or adjusted under 35 U.S.C. 154(b) by 241 days.

(21) Appl. No.: 11/260,138

(22) Filed: Oct. 28, 2005

(65) Prior Publication Data

US 2006/0182634 A1 Aug. 17, 2006

(30) Foreign Application Priority Data

Oct. 29, 2004 (DE) .................... 10 2004 052 598

(51) Int. Cl.
*F03D 11/00* (2006.01)

(52) U.S. Cl. ..................................... 415/229
(58) Field of Classification Search .................... 416/26
See application file for complete search history.

(56) References Cited

U.S. PATENT DOCUMENTS

| | | | |
|---|---|---|---|
| 6,113,276 A * | 9/2000 | Bourgeois-Jacquet | 384/448 |
| 6,870,281 B2 | 3/2005 | Weitkamp | |
| 2004/0253093 A1 * | 12/2004 | Shibata et al. | 415/4.1 |
| 2005/0276696 A1 * | 12/2005 | LeMieux | 416/61 |
| 2006/0153675 A1 * | 7/2006 | Rogall et al. | 415/170.1 |

FOREIGN PATENT DOCUMENTS

| | | |
|---|---|---|
| DE | 37 25 972 C2 | 2/1989 |
| DE | 697 24 343 T2 | 6/1997 |
| DE | 199 17 498 A1 | 1/2000 |
| DE | 101 41 098 A1 | 3/2003 |

OTHER PUBLICATIONS

Office Action dated Aug. 12, 2005 and English language translation of Office Action.

* cited by examiner

*Primary Examiner*—Richard Edgar
(74) *Attorney, Agent, or Firm*—Buchanan Ingersoll & Rooney PC

(57) ABSTRACT

A wind power plant comprises an outside ring, an inside ring and roll bodies arranged between an inside jacket of the outside ring and an outside jacket of the inside ring for permitting twisting or rotation of the bearing rings against one another. One of the rings on the jacket comprises an auxiliary sensor at least along a portion of the periphery. The auxiliary sensor together with the primary sensor provided in the other bearing ring are configured in such a way that a twisting or rotational position of the two bearing rings relative to one another can be detected.

19 Claims, 3 Drawing Sheets ized, the sensor system also operates in the presence of lubricants, for example fats and/or oils, between the bearing rings.

WIND POWER PLANT

This application is based on and claims priority under 35 U.S.C. § 119 with respect to German Application No. 10 2004 052 598.6 filed on Oct. 29, 2004, the entire content of which is incorporated herein by reference.

FIELD OF THE INVENTION

The invention generally relates to a wind power plant. More particularly, the present invention pertains to a wind power plant provided with a nacelle bearing and/or a blade pitch bearing.

BACKGROUND OF THE INVENTION

Wind power plants are oftentimes configured so that the rotor blades of the wind power plant, based on the respective wind speed, are brought into a specific position. To achieve this goal, the rotor blades must be mounted in a correspondingly adjustable manner. In addition, it is known that in a number of wind power plants with a nacelle that is mounted to rotate, the nacelle requires a brake so that the nacelle can be held in the direction of the wind.

A need exist for a wind power plant constructed to achieve sufficient compactness, particularly in the area of the blade support and/or the nacelle support.

SUMMARY

According to one aspect, a wind power plant comprises an outside bearing ring, an inside bearing ring, and roll bodies arranged between an inside surface of the outside bearing ring and an outside surface of the inside bearing ring to permit twisting or rotation of the bearing rings relative to or against one another. One of the bearing rings on said surface comprises an auxiliary sensor extending at least along a portion of the bearing ring, and the auxiliary sensor is configured together with a primary sensor provided on the other bearing ring in such a manner that a twisting or rotational position of the two bearing rings with respect to one another can be detected.

Since the sensor system can be provided as an integral component of the inside bearing ring and the outside bearing ring of the bearing arrangement, there is no additional space requirement for a separately designed sensor system. In this case, the sensor system can be integrated advantageously without a change in the outside dimensions of previously used inside and outside bearing rings. By this integration, not only is the compactness advantageously increased, but at the same time, cost concerns are correspondingly improved because of the reduced number of individual components. In addition, an extensive industrial preassembly is thus also advantageously possible.

In one embodiment, the auxiliary sensor and the primary sensor are arranged without touching one another. As a result, wear of the sensor arrangement is avoided. In addition, the sensor system also operates in the presence of lubricants, for example fats and/or oils, between the bearing rings.

According to another aspect, one of the bearing rings comprises a braking surface that extends in a circular manner and the other bearing ring comprises braking means that can be actuated, with at least one portion pressed against the braking surface area. Thus, in addition to the sensor system, a braking system can be integrated into the bearing arrangement, which is of special advantage especially in a nacelle bearing, since separate components for the sensor and braking system are avoided. Compared to conventional bearing rings, which are free of integration components, only slightly axially-widened dimensions are to be provided for the rings with an integrated sensor and braking system.

In accordance with another aspect, a wind power plant comprises a blade pitch bearing arrangement supporting a rotor blade, and a nacelle bearing arrangement supporting a nacelle. At least one of the blade pitch bearing arrangement and the nacelle bearing arrangement comprises a first bearing ring, a second bearing ring having a facing surface which faces a facing surface of the first bearing ring, roll bodies arranged between the facing surfaces of the first and second bearing rings to permit rotation of the first and second bearing rings relative to one another, an auxiliary sensor mounted at the facing surface of the first bearing ring, and a primary sensor mounted at the facing surface of the second bearing ring, the auxiliary sensor and the primary sensor operating together to detect a relative rotational position of the first and second bearing rings.

BRIEF DESCRIPTION OF THE DRAWING FIGURES

DETAILED DESCRIPTION

Figure 3:
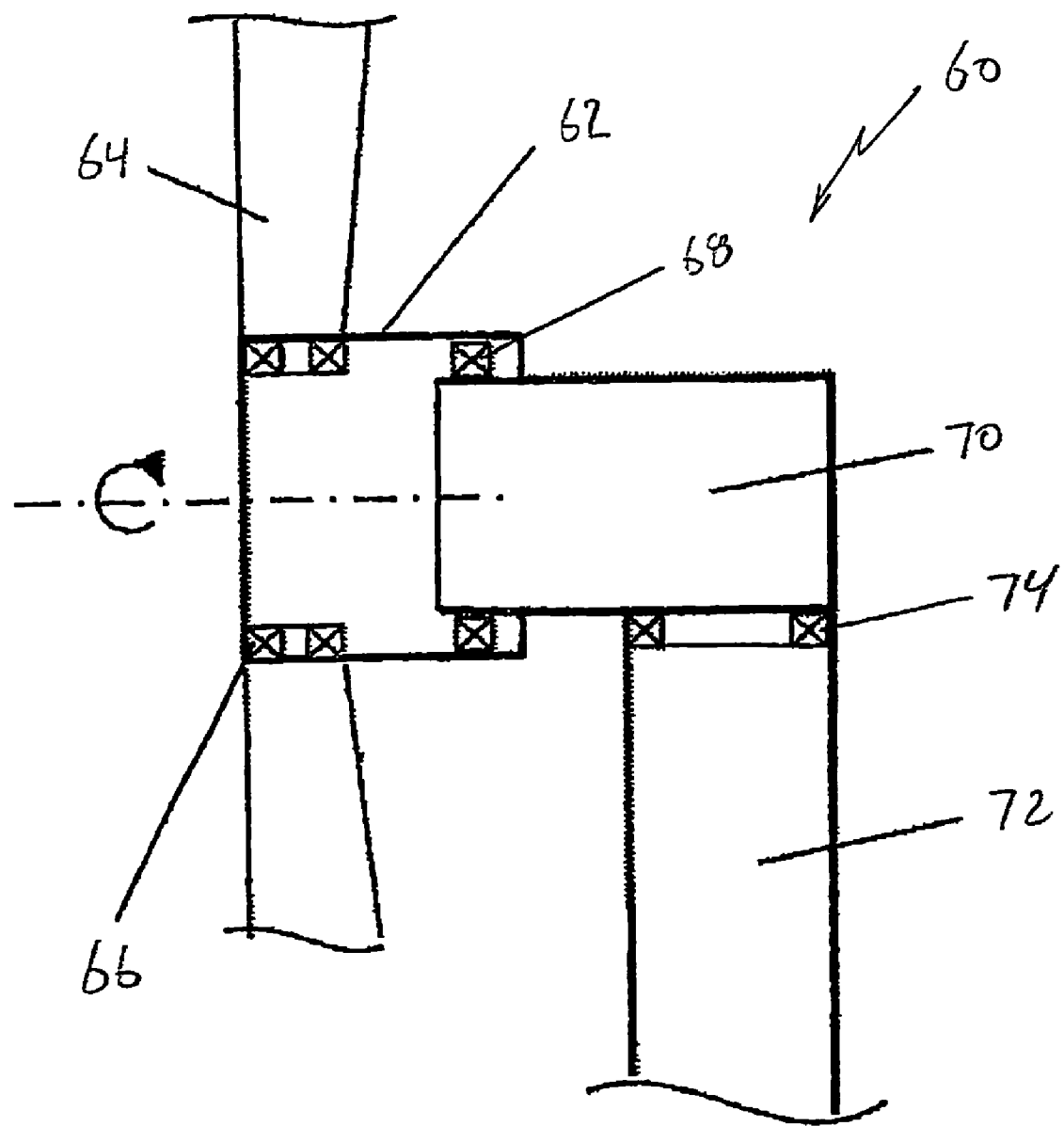
FIG. 3 is a schematic illustration of a wind power plant in which one or both of the blade support and nacelle support can be used.

Referring initially to FIG. 3, a wind power plant is schematically illustrated. Generally speaking, the wind power plant includes a tower 72 supporting a nacelle 70 by way of a nacelle bearing arrangement 74, a main shaft 62 supported relative to the nacelle by way of a main bearing arrangement 68, and rotor blades 64 supported on the main shaft 62 by way of a blade pitch bearing arrangement 66.

Figure 1:
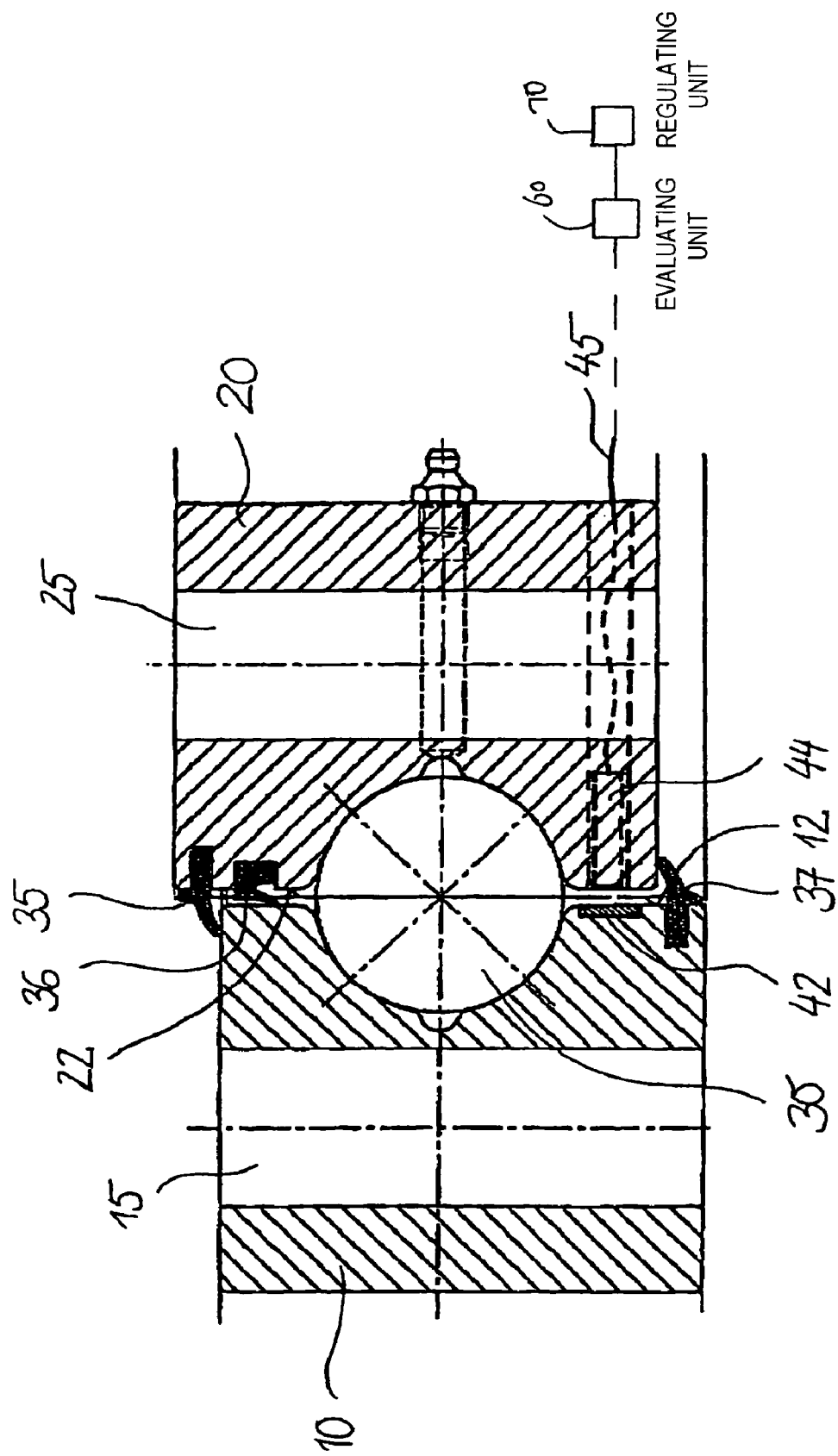
FIG. 1 is a cutaway cross-sectional view through a blade support of a wind power plant.

One embodiment of the invention is shown in FIG. 1 which is a cross-sectional view through the blade pitch bearing arrangement that supports the rotor blade(s) of a wind power plant, whereby as a cutaway of the section, the blade pitch bearing arrangement is guided to a circumferential point.

Generally speaking, the blade pitch bearing arrangement comprises an outside bearing ring, an inside bearing ring, and roll bodies arranged between the inside surface of the outside bearing ring and the outside surface of the inside bearing ring to permit twisting or rotation of the bearing rings relative to one another. As shown in FIG. 1, the roller bearing arrangement in this case comprises a first roller bearing ring 10 and a second roller bearing ring 20, which essentially are arranged concentrically to one another. In addition, roll bodies 30 designed as spheres are arranged between the respective facing jackets or surfaces 12, 22 of the bearing rings that face one another to permit the two roller bearing rings 10, 20 to swivel or rotate relative to or against one another.

In addition, between the two roller bearing rings 10, 20, the bearing arrangement comprises acting seals 35, 36 37. By virtue of these seals, a penetration of, for example, dirt and moisture from outside into the sealed space is prevented. In this case, the roller bearing rings 10, 20 are designed with several axial holes 15, 25, arranged in a manner distributed in the peripheral direction, for fastening the roller bearing rings 10, 20 to corresponding components of the other wind power plant.

To detect a twisting position or rotational position of the two roller bearing rings 10, 20 relative to one another, comprising a zero-position detection, the blade pitch bearing arrangement comprises a correspondingly prepared sensor system as an integral component. In this case, the sensor system comprises an auxiliary sensor 42. In this disclosed embodiment, the auxiliary sensor 42 is designed as a bending-elastic magnetizable band with alternating poles. The sensor 42 extends in a circumferential direction of the ring and is arranged to extend along at least a 90° segment or arc in a correspondingly shaped groove provided in the surface 12 of the first roller bearing ring 10. In this case, the 90° circumferential extent of the sensor is sufficient for use in the blade bearing because generally the blades cannot be swung beyond a range of 0 to 90°.

At least at one point opposite the 90° range, on the facing surface 22 of the second roller bearing ring 20 that, independently of a swinging position, does not project beyond the 90° range in an assembly and operation of the roller bearing rings 10, 20 according to requirements, a primary sensor 44 is provided. This primary sensor 44, which together with the auxiliary sensor is adapted to detect the twisting or rotational position, is arranged in a radially directed groove or hole in the second roller bearing ring 20. In this illustrated embodiment, the hole which receives the primary sensor 44 is preferably arranged between two of the holes 25 of the second roller bearing ring 20.

In this disclosed embodiment, the auxiliary sensor 42 is arranged to be always spaced apart from the primary sensor 44 so that the auxiliary sensor 42 does not touch the primary sensor 44. The two sensors are adapted to one another in such a way that a twisting or rotational position can be detected accordingly. The starting signal of the primary sensor 44 that characterizes the respective rotational or twisting position is conveyed by way of a corresponding connecting line 45 to an evaluating unit 60, which in turn is connected to a corresponding control or regulating unit 70 for the adjustment of the blades, or is an integral component thereof. Further details with respect to a design of the sensor system can be seen in, for example, DE 697 24 343 T1 and corresponding U.S. Pat. No. 6,113,276, the entire disclosures of which are incorporated herein by reference.

Figure 2:
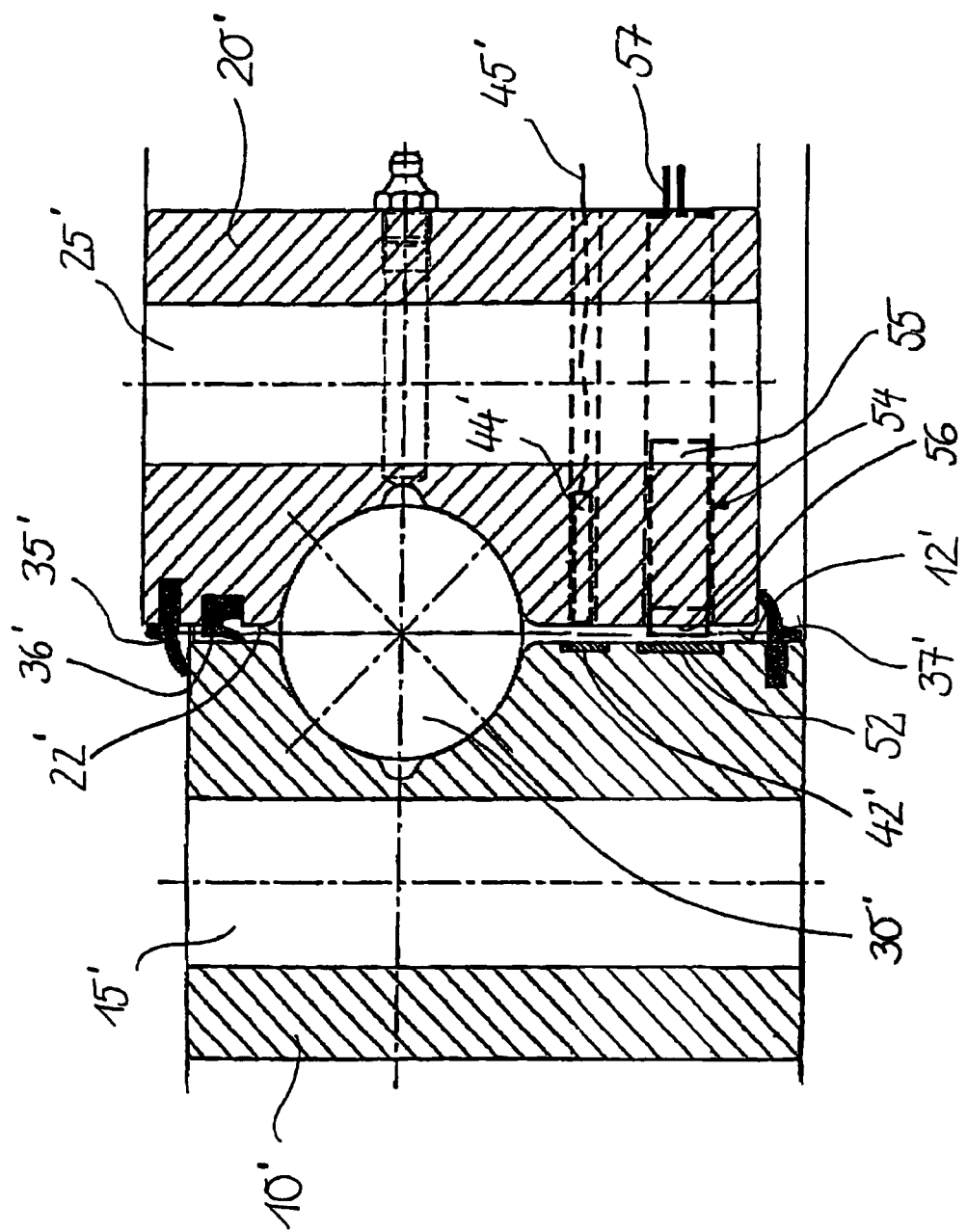
FIG. 2 is a cutaway cross-sectional view through a nacelle support of a wind power plant.

A second embodiment of the invention is depicted in FIG. 2 which is a cross-sectional view through the nacelle bearing arrangement for supporting the nacelle of the wind power plant, whereby it is guided as a cutaway of the section to a peripheral point of the roller bearing arrangement. In FIG. 2, components similar to those shown in FIG. 1 and described above are referred to by the same reference numbers as in FIG. 1, supplemented by an apostrophe. A detailed description of components in the second embodiment that correspond to those associated with the first embodiment is not repeated.

Compared to the roller bearing arrangement shown in FIG. 1, the auxiliary sensor 42' in FIG. 2 extends not only along a 90° circumferential segment, but is designed to extend in a circular way (a complete circle), since, of course, in the case of the nacelle bearing, there is no limitation of the swinging area as in the case of the blade support. In addition, the nacelle bearing arrangement of FIG. 2 comprises a braking system as an integral component.

In the disclosed embodiment, the braking system comprises an element presenting a braking surface 52 that extends in a circular fashion or circumferential direction and that is arranged in a corresponding groove of the surface 12' of the first roller bearing ring 10'. At least at one point opposite the braking surface 52, the surface 22' of the second roller bearing ring 20' is provided with braking means 54 for applying a braking force by acting against the braking surface 52. The braking means 54 is arranged in a corresponding, radially-directed hole in the second roller bearing ring 20'. In this case, the hole for the braking means 54 is preferably arranged between two adjacent holes 25' of the second roller bearing ring 20'. According to one possibility, the braking means 54 is comprised of a piston 55 that can be moved hydraulically within the hole. As a part of the braking means, a movable brake shoe is positioned directly opposite the braking surface 52. In the disclosed embodiment, the brake shoe 56 is movable by virtue of being provided on the front face of the piston 55 that faces the braking surface 52. The brake shoe 56 can be in the form of a removable or replaceable brake shoe 56. Since the brake shoe 56 is connected to the piston 55 in a replaceable manner or detachable manner, the brake shoe 56 can be simply replaced as a single part subject to wear of the bearing arrangement, for example within the framework of routine inspections, if necessary. The braking means is controllable by way of a corresponding feeder. In the illustrated embodiment, on the end of the hole remote from or facing away from the braking surface 52, the hole in which the piston 55 is positioned is closed by way of a hydraulic connection 57. By way of this connection, hydraulic fluid can be introduced into or drawn out from the hole to effect a corresponding movement of the piston 55.

In other embodiments, the piston can be actuated electromechanically and/or at least two pistons that are opposite to one another relative to a diameter of the roller bearing ring are provided, by which the forces exerted by the actuated braking means on the roller bearing rings are advantageously eliminated vectorially.

The principles and preferred embodiments have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A wind power plant comprising a nacelle supported relative to a shaft, a plurality of rotor blades supported on the shaft, an outside bearing ring, an inside bearing ring, roll bodies arranged between an inside surface of the outside bearing ring and an outside surface of the inside bearing ring to permit rotation of the inner and outer bearing rings relative to one another, one of the bearing rings comprising an auxiliary sensor extending circumferentially along at least a portion of the one bearing ring, the other bearing ring comprising a primary sensor, the auxiliary sensor together with the primary sensor being configured to detect a rotational position of the inner and outer bearing rings relative to one another.

2. The wind power plant according to claim 1, wherein the auxiliary sensor and the primary sensor are spaced apart from one another so that the auxiliary sensor and the primary sensor do not touch one another.

3. The wind power plant according to claim 1, wherein the auxiliary sensor is a magnetizable band with alternating poles.

4. The wind power plant according to claim 1, wherein the auxiliary sensor is arranged in a groove formed in the one bearing ring.

5. The wind power plant according to claim 1, wherein the inner and outer rings, the roll bodies, the auxiliary sensor and the primary sensor are part of a blade support supporting the rotor blades of the wind power plant.

6. The wind power plant according to claim 1, wherein one of the inner and outer bearing rings comprises a braking surface extending in a circular manner, and the other of the inner and outer bearing rings comprises braking means adapted to press against the braking surface for applying a braking force.

7. The wind power plant according to claim 6, wherein the braking means is controllable via a corresponding feeder.

8. The wind power plant according to claim 6, wherein the braking means is actuated hydraulically.

9. The wind power plant according to claim 6, wherein the braking means is positioned in the same bearing ring as the primary sensor.

10. The wind power plant according to claim 6, wherein the braking means comprises a piston adapted to move along an axis.

11. The wind power plant according to claim 6, wherein the braking means comprises a movable brake shoe positioned directly opposite the braking surface.

12. The wind power plant according to claim 11, wherein the brake shoe is connected to a piston mounted in a hole in and the other of the inner and outer bearing rings.

13. The wind power plant according to claim 6, wherein the inner and outer bearing rings, the roll bodies, the auxiliary sensor, the primary sensor, the braking surface, and the braking means are part of a nacelle support which supports the nacelle of the wind power plant.

14. The wind power plant according to claim 6, wherein the braking means is arranged in a radially extending hole provided in the other of the inner and outer bearing rings.

15. The wind power plant according to claim 1, wherein the primary sensor is arranged in a radially extending hole provided in the other bearing ring.

16. The wind power plant according to claim 1, wherein the auxiliary sensor is mounted in a groove provided in one of the inside surface of the outside bearing ring and the outside surface of the inside bearing ring, and the primary sensor is mounted in a groove provided in the other of the inside surface of the outside bearing ring and the outside surface of the inside bearing ring.

17. A wind power plant comprising:
a blade pitch bearing arrangement supporting a rotor blade;
a nacelle bearing arrangement supporting a nacelle;
at least one of the blade pitch bearing arrangement and the nacelle bearing arrangement comprising a first bearing ring, a second bearing ring having a facing surface which faces a facing surface of the first bearing ring, roll bodies arranged between the facing surfaces of the first and second bearing rings to permit rotation of the first and second bearing rings relative to one another, an auxiliary sensor mounted at the facing surface of the first bearing ring, and a primary sensor mounted at the facing surface of the second bearing ring, the auxiliary sensor and the primary sensor operating together to detect a relative rotational position of the first and second bearing rings.

18. The wind power plant according to claim 17, further comprising a braking surface provided at the facing surface of one of the first and second bearing rings and a piston movably positioned in the other of the first and second bearing rings to press against the braking surface and apply a braking force.

19. A bearing arrangement of a wind power plant, wherein the wind power plant includes a nacelle supported relative to a shaft and a plurality of rotor blades supported on the shaft, the bearing arrangement comprising an outside bearing ring, an inside bearing ring, roll bodies arranged between an inside surface of the outside bearing ring and an outside surface of the inside bearing ring to permit rotation of the inner and outer bearing rings relative to one another, one of the bearing rings comprising an auxiliary sensor extending circumferentially along at least a portion of the one bearing ring, the other bearing ring comprising a primary sensor, the auxiliary sensor together with the primary sensor being configured to detect a rotational position of the inner and outer bearing rings relative to one another, one of the inner and outer bearing rings comprising a braking surface extending in a circular manner, and the other of the inner and outer bearing rings comprising braking means adapted to press against the braking surface for applying a braking force.

* * * * *